United States Patent
Musikka et al.

(10) Patent No.: US 6,958,983 B2
(45) Date of Patent: Oct. 25, 2005

(54) METHOD AND SYSTEM FOR OPTIMAL ROUTING OF CALLS IN A BASE STATION SYSTEM

(75) Inventors: Niilo Musikka, Bromma (SE); Lars Lindén, Hästveda (SE); Lennart Rinnbäck, Järfälla (SE); Peter Galyas, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 877 days.

(21) Appl. No.: 09/738,067

(22) Filed: Dec. 15, 2000

(65) Prior Publication Data

US 2002/0015392 A1 Feb. 7, 2002

Related U.S. Application Data

(60) Provisional application No. 60/177,819, filed on Jan. 25, 2000.

(51) Int. Cl.[7] .............................................. H04Q 7/00
(52) U.S. Cl. ........................ 370/329; 370/331; 370/338; 370/401; 455/422.1
(58) Field of Search ................................ 370/329, 332, 370/338, 401, 405, 410, 331; 455/422.1, 439, 436, 442, 445, 426

(56) References Cited

U.S. PATENT DOCUMENTS

| | | | | |
|---|---|---|---|---|
| 5,422,935 A | | 6/1995 | Spear | 379/63 |
| 5,761,195 A | * | 6/1998 | Lu et al. | 370/329 |
| 6,292,891 B1 | * | 9/2001 | Bergenwall et al. | 713/151 |
| 6,366,961 B1 | * | 4/2002 | Subbiah et al. | 709/238 |
| 6,377,799 B1 | * | 4/2002 | Hameleers et al. | 455/422.1 |
| 6,515,997 B1 | * | 2/2003 | Feltner et al. | 370/401 |
| 6,539,237 B1 | * | 3/2003 | Sayers et al. | 455/555 |
| 6,654,361 B1 | * | 11/2003 | Dommety et al. | 370/331 |
| 6,654,931 B1 | * | 11/2003 | Haskell et al. | 370/331 |

FOREIGN PATENT DOCUMENTS

| | | |
|---|---|---|
| EP | 0 466 078 A2 | 1/1992 |
| WO | WO 96/21999 | 7/1996 |

OTHER PUBLICATIONS

International Search Report for PCT/SE 01/00103, May 22, 2001.

* cited by examiner

Primary Examiner—Afsar Qureshi

(57) ABSTRACT

A method and system are provided for optimal routing of calls in an Internet Protocol-based Base Station System (IP-based BSS), whereby a plurality of new messages are introduced on the A-interface. One such message informs the BSS that the Circuit Identity Codes (CICs) included in the message can be connected to the BSS to provide optimal routing of one or more calls. Another such message informs the BSS that the CICs included in the message are to be restored as separate CICs on the A-interface. The provision of such messages overcomes the significant disadvantages of the existing and developing BSS implementations.

10 Claims, 4 Drawing Sheets

METHOD AND SYSTEM FOR OPTIMAL ROUTING OF CALLS IN A BASE STATION SYSTEM

CROSS-REFERENCES TO RELATED APPLICATIONS

This Application for Patent claims the benefit of priority from, and hereby incorporates by reference the entire disclosure or, co-pending U.S. Provisional application for patent Ser. No. 60/177,819, filed Jan. 25, 2000.

This Application for Patent also incorporates by reference the entire disclosure of commonly-assigned, co-pending U.S. application for patent Ser. No. 09/494,606, filed Jan. 31, 2000.

BACKGROUND OF THE INVENTION

1. Technical Field of the Invention

The present invention relates in general to the mobile telecommunications field and, in particular, to a method and system for optimal routing of calls in a Base Station System (BSS).

2. Description of Related Art

FIG. 1 is a block diagram of an existing Global System for Mobile Communications (GSM) system model. Referring to FIG. 1, the GSM model (10) shown includes a Radio Access Network (RAN) known as a BSS (12). The BSS includes two types of logical nodes: a Base Transceiver Station (BTS) 14; and a Base Station Controller (BSC) 16. In order to support circuit-switched speech or data services, the BSC 16 inter-operates or interworks ("interworking" is a term of art) with a Mobile Switching Center (MSC) 18 via an open (non-proprietary) interface known as an A-interface. As such, an MSC (e.g., 18) can serve one or more BSCs.

Each BSC in a GSM network can control a plurality (typically hundreds) of radio cells. In other words, each BSC (e.g., 16) interworks with a plurality (hundreds) of BTSs via respective Abis interfaces. Each BTS (e.g., 14) is responsible for the transmission and reception of radio signals over an air interface, Um, in one cell. Consequently, the number of cells in a GSM BSS is equal to the number of BTSs in that BSS. As such, the BTSs are geographically distributed to provide adequate radio coverage of a BSC area, which forms part of a GSM Public Land Mobile Network (PLMN).

Additionally, the BTSs provide the capacity to carry a plurality of connections (calls) between Mobile Stations (MSs) (e.g., 22) and respective BSCs. In the GSM, each BTS is equipped with one or more Transceivers (TRXs). Each such TRX (not shown) is capable of handling eight timeslots of a Time Division Multiple Access (TDMA) frame. Furthermore, each such timeslot can be assigned different combinations of logical channels, such as, for example, Broadcast Control Channels (BCCHs) and Common Control Channels (CCCHs), Stand-alone Dedicated Control Channels (SDCCHs), and Traffic Channels (TCHs).

FIG. 2 is a block diagram of an Internet Protocol (IP)—based BSS 100, which has been developed by Ericsson. A more detailed description of such an IP-based BSS is disclosed in the above-described commonly-assigned, co-pending U.S. application for patent Ser. No. 09/494,606, the entire disclosure of which is incorporated herein by reference.

Referring to FIG. 2, the IP-based BSS 100 can include three types of nodes connected to an IP network 108. A first node connected to the IP network 108 is an RBS 102. In general, the RBS 102 functions similarly to existing RBSs used for implementing a GSM model. Moreover, the RBS 102 also provides IP support for the BSS 100. For example, the RBS 102 functions as an IP host and can include an IP router (not shown). The IP router can be used to route payload User Datagram Protocol (UDP) datagrams to one or more Transmitter/Receivers (TRXs) and also for connecting a plurality of RBSs in various topologies.

A second node connected to the IP network 108 is a GateWay (GW) 104. The GW 104 can be used to terminate the A-interface. Also, the GW 104 can perform a conversion from one protocol (e.g., SS7 protocol) to another protocol (e.g., Transmission Control Protocol (TCP)/IP). The GW 104 can also include a Media GW (MGW) which functions similarly to existing Transcoder Controllers in an Ericsson implementation of the GSM model. The MGW (not shown) includes a pool of Transcoder/Rate Adaptor (TPA) devices (not shown), which, when allocated, are connected to the A-interface. However, the IP network (e.g., GSM) side of the TRAs in the MGW are connected to respective UDP ports. Preferably, the GW 104 is connected to the IP network 108 via a separate router (not shown).

A third node connected to the IP network 108 is a Radio Network Server (RNS) 106. The RNS 106 functions similarly to a BSC used for implementing a GSM model. A primary difference between the RNS 106 and a BSC is that the RNS does not switch payloads and does not include a Group Switch (GS). As such, the RNS 106 preferably carries signalling only, and includes a pool of processors (e.g., the number of processors determined by capacity requirements). The RNS 106 provides a robust, general purpose distributed processing environment, which can be based on a standard operating system such as, for example, SUN/Solaris™. The RNS 106 can serve one or more logical BSCs and is preferably connected to the IP network 108 via a separate router. As such, the payload can be routed directly between the GW 104 and RBS 102, without passing through the RNS' 106 processors. The A-interface signalling is routed between the RNS 106 and GW 104.

FIG. 3 is a block diagram of an implementation of a BSS, which can be used to illustrate the significant technical problems that need to be resolved. Referring to FIG. 3, in accordance with GSM Technical Specification (TS) 08.08, in a BSS (e.g., 200), all connections for the circuit-switched services are conveyed via the A-interface. As such, for example, if a speech call is being conducted between two parties in neighboring cells, the call is routed via the MSC 212. This routing occurs because the BSS 200 does not know that the two "half calls" (e.g., Signalling Connection-a 214 and Signalling Connection-b 216) belong to the same "full call" or conversation. This approach results in a so-called tromboning effect, which has significant disadvantages such as relatively high transmission costs, degraded speech quality, and longer delay. Consequently, with the increasing success and market penetration of mobile telephony, the number of mobile-to-mobile calls is expected to increase dramatically, and based on past experience, most of these calls will be local (i.e., within one BSS).

As illustrated by the BSS 200 shown in FIG. 3, in existing BSS implementations, semi-permanent circuit-switched connections are used between the BTSs 206, 208 and the BSC 210. The MSC 212 sends an Assignment Request Message to the BSS 200, which informs the BSS what circuit is conveying the "half call". The Circuit Identity Code (CIC) Information Element (IE) in the Assignment Request Message provides the actual reference point information for the call. For example, the "half call" for Mobile Station-a (MS-a) 202 is associated with CIC-a 218, and the "half call" for MS-b 204 is associated with CIC-b 220. A signalling connection (e.g., Signalling Connection-a and -b 214, 216) is provided between MSC 212 and BSC 210 and MS-a 202 or MS-b 204 for each "half call". In any event, MSC 212 is required to have complete control of the "full call" for a number of reasons, such as, for example, the MSC maintains the charging accounts, provides the dialling tone, and handles subscriber services (e.g., call transfer). In any event, as described in detail below, the present invention successfully resolves the above-described problems, and also resolves other related problems.

SUMMARY OF THE INVENTION

In accordance with a preferred embodiment of the present invention, a method and system are provided for optimal routing of calls in an IP-based BSS, whereby a plurality of new messages are introduced on the A-interface. One such message informs the BSS that the CICs included in the message can be connected to the BSS to provide optimal routing of one or more calls. Another such message informs the BSS that the CICs included in the message are to be restored as separate CICs on the A-interface. The provision of such messages overcomes the above-described and other related disadvantages of the existing and developing BSS implementations.

An important technical advantage of the present invention is that the tromboning problems associated with existing BSS implementations are resolved.

Another important technical advantage of the present invention is that no circuit-switching procedures are involved, which greatly simplifies the resolution of problems with the existing BSS implementations.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–7B of the drawings, like numerals being used for like and corresponding parts of the various drawings.

Essentially, in accordance with a preferred embodiment of the present invention, a method and system are provided for optimal routing of calls in an IP-based BSS, whereby a plurality of new messages are introduced on the A-interface. One such message informs the BSS that the CICs included in the message can be connected to the BSS to provide optimal routing of one or more calls. Another such message informs the BSS that the CICs included in the message are to be restored as separate CICs on the A-interface. The provision of such messages overcomes the above-described and other related disadvantages of the existing and developing BSS implementations.

Specifically, in accordance with the preferred embodiment of the present invention, two new messages can be introduced for use in a BSS on an A-interface. One such message, hereinafter referred to as a "Join CIC" message, for example, includes IEs with information about which CICs and Signalling Connections belong to a single conversation, and thus the associated call can be routed in an optimal fashion. A second such message, hereinafter referred to as a "Restore CIC" message, for example, includes IEs with information about which CICs are to be restored separately on the A-interface. For this exemplary embodiment, the MSC sends a "Join CIC" message to the BSS, in order to inform the BSS that the CICs included in the message can be connected in the BSS in a manner that will provide optimal routing. However, the signalling connections towards the MSC should be maintained, so that any of the MS' parties can be capable of invoking subscriber services, for example, if required.

Figure 1:
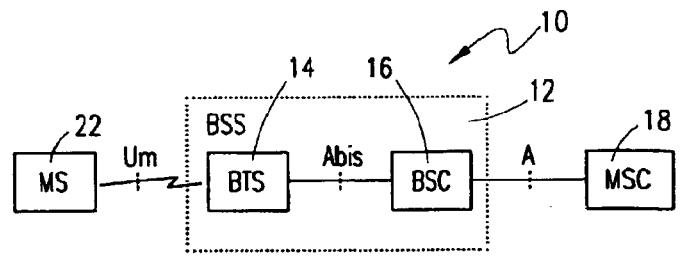
FIG. 1 is a block diagram of an existing GSM system model.
Figure 2:
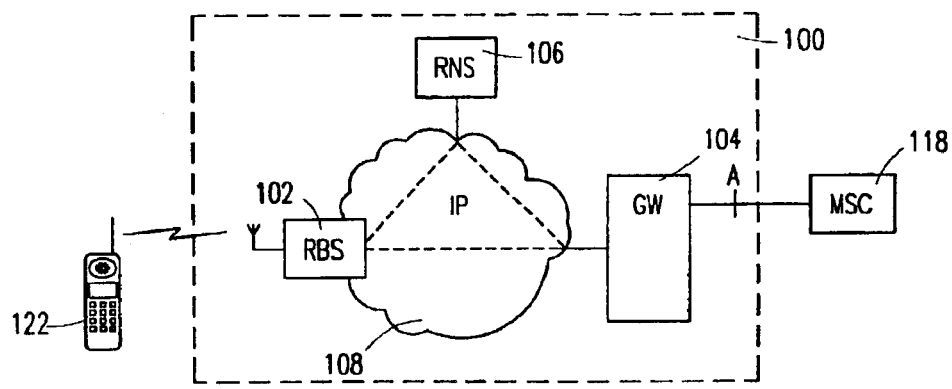
FIG. 2 is a block diagram of an IP-based BSS.
Figure 3:
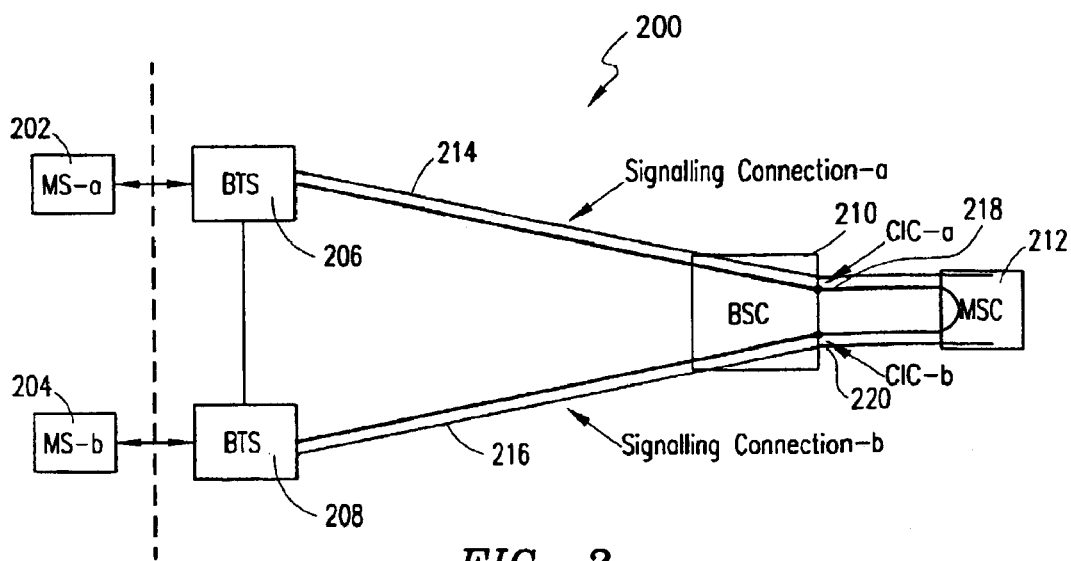
FIG. 3 is a block diagram of an implementation of a BSS which can be used to illustrate significant technical problems that need to be resolved.
Figure 4:
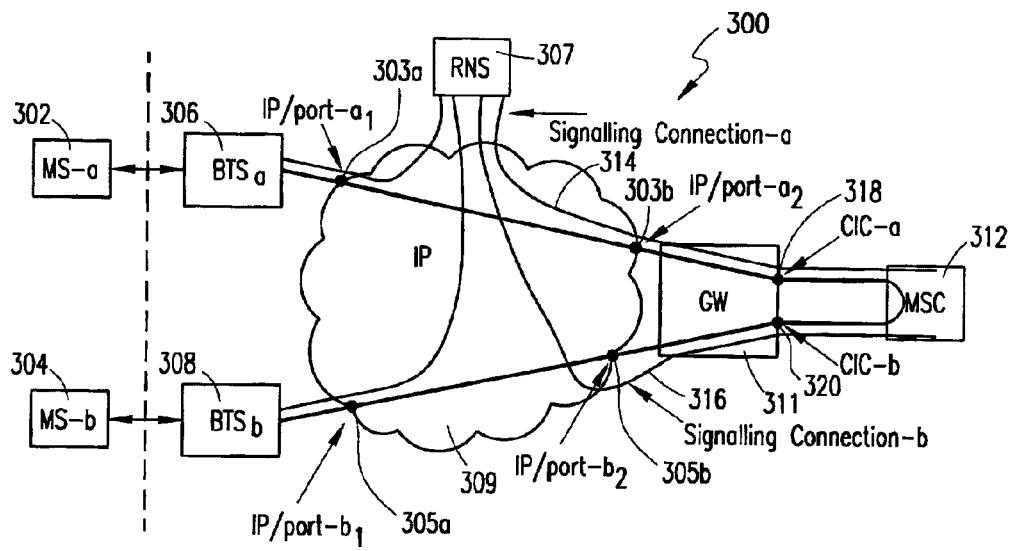
FIG. 4 is a block diagram of an IP-based BSS, which can be used to implement a preferred embodiment of the present invention.

FIG. 4 is a block diagram of an IP-based BSS 300, which can be used to implement a preferred embodiment of the present invention. As illustrated by the IP-based BSS 300 shown in FIG. 4, the RNS 307 keeps track of all the connections in the BSS. The connection point at a BTS (306 or 308) or the GW 311 is associated with an IP address and port number. A BSC is divided into a server part, RNS 307, and GW 311 (payload handling part).

Referring to FIG. 4, the exemplary embodiment is shown with connections already setup. As shown, if the MSC 312 sends a "Join CIC" message to the BSS 300, and thereby executes the Join CIC procedure on either of the two Signalling Connections (a or b) 314 or 316, the RNS 307 can respond by connecting $BTS_a$ 306 to $BTS_b$ 308. This function can be accomplished by the RNS 307 ordering $BTS_a$ 306 to start sending speech packets to $BTS_b$ 308. Consequently, instead of sending speech packets to IP/port-$a_2$ 303b, $BTS_a$ 306 sends speech packets to IP/port-$b_1$ 305a. The RNS 307 also orders $BTS_b$ 308 to start sending speech packets to $BTS_a$ 306. Consequently, instead of sending speech packets to IP/port-$b_2$ 305b, $BTS_b$ 308 sends speech packets to IP/port-$a_1$ 303a. The RNS 307 also instructs the GW 311 to suspend the sending of packets to $BTS_a$ 306 and $BTS_b$ 308 (via IP/port-$a_1$ 303a and IP/port-$b_1$ 305a).

Figure 5:
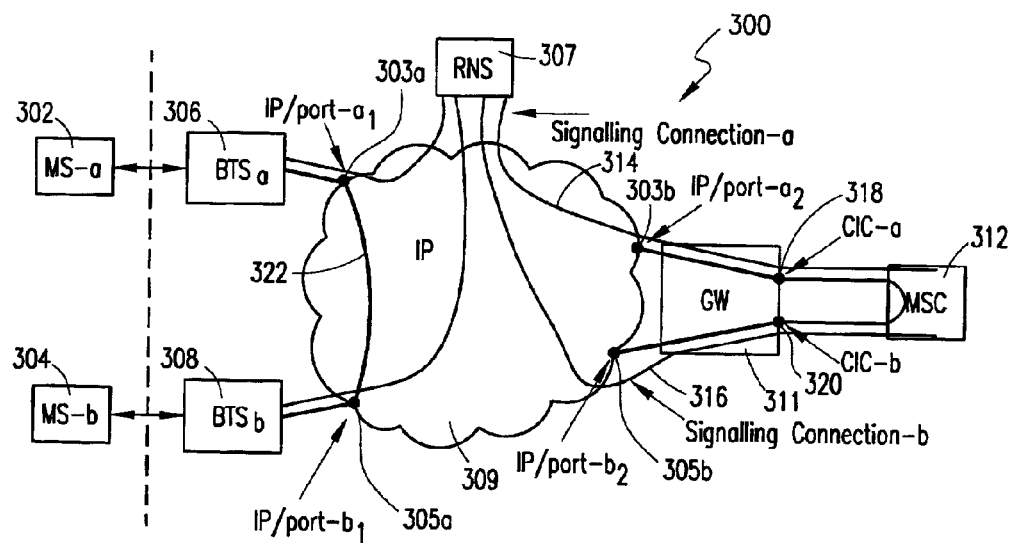
FIG. 5 is a block diagram of an IP-based BSS, which illustrates the execution of a "Join CIC" procedure, in accordance with the preferred embodiment of the present invention.

A result of executing the "Join CIC" procedure in the above-described fashion is shown in FIG. 5. As illustrated in FIG. 5, by the MSC 312 sending a "Join CIC" message to the BSS 300 in accordance with the preferred embodiment, a more direct connection 322 for speech packets can be made between $BTS_a$ 306 and $BTS_b$ 308 via IP/port-$a_1$ 303a and IP/port-$b_1$ 305a in IP network 309.

If the MSC 312 desires to restore the original setup (e.g., as shown in FIG. 4), the MSC can send a "Restore CIC" message to the BSS 300. In this case, the RNS 307 instructs $BTS_a$ 306 to start sending the speech packets to IP/port-$a_2$ 303b, and also instructs $BTS_b$ 308 to start sending the speech packets to IP/port-b$_2$ 305b. The RNS 307 instructs the GW 311 to resume sending speech packets for the two connections IP/port-a$_2$ 303b and IP/port-b$_2$ 305b.

Typically, in most cases, the above-described restoration procedure (instigated by the "Restore CIC" message for the preferred embodiment) should not be needed. Therefore, in most cases, the optimal routing procedure (instigated by the "Join CIC" message, for the preferred embodiment) can be maintained until the ongoing call is cleared from the MSC 312. Nevertheless, an issue that arises in this regard is that when speech information is conveyed directly between BTSs (and the MSs), the same speech coding should be employed in both directions. As such, in order to reach agreement about common speech coding in this regard, negotiations between the two MSs and the BSS have to be conducted. Notably, however, the European Telecommunications Standards Institute (ETSI) has set forth rules for conducting such negotiations.

For this exemplary embodiment, the connection path in the IP network 309 between the transcoders in the GW 311 and the BTSs 306 and 308, the transcoders themselves, and appropriate communication resources in the MSC 312 are maintained during a call during execution of a "Join CIC" procedure for optimal routing. The purpose for this practice is to make sure that these resources remain available in the event that the original connection path has to be re-established. (Note that a connection path in an IP network is actually reserved bandwidth and not a physical path, as in a circuit-switched network.) If the MSC 312 desires to intervene in a call (e.g., a third party is to be connected to the call), the MSC again informs the RNS 307 by sending a "Restore CIC" message to the RNS so that the RNS can reconnect the MSC into the call. The re-connection can be made by replacing existing IP addresses with appropriate new IP addresses in the BTSs 306 and 308.

Essentially, for this embodiment, a handover procedure for directly connected BTSs (e.g., during execution of a "Join CIC" procedure) can also be accomplished by replacing existing IP addresses with appropriate new IP addresses. For a relatively short duration during the handover procedure, a BTS sends speech packets to both an "old" and "new" BTS. When the handover procedure is completed, the "old" BTS can be removed from the call. As such, once a mutual connection is established between the two BTSs upon completion of the handover procedure, the "old" BTS can be completely disconnected from the call. However, if the handover procedure is unsuccessful, the "new" BTS can be removed from the call and the original connection can continue to proceed. If a subscriber leaves the RNS's area, the remaining connection is disconnected from the transcoder in the GW involved.

Figure 6A:
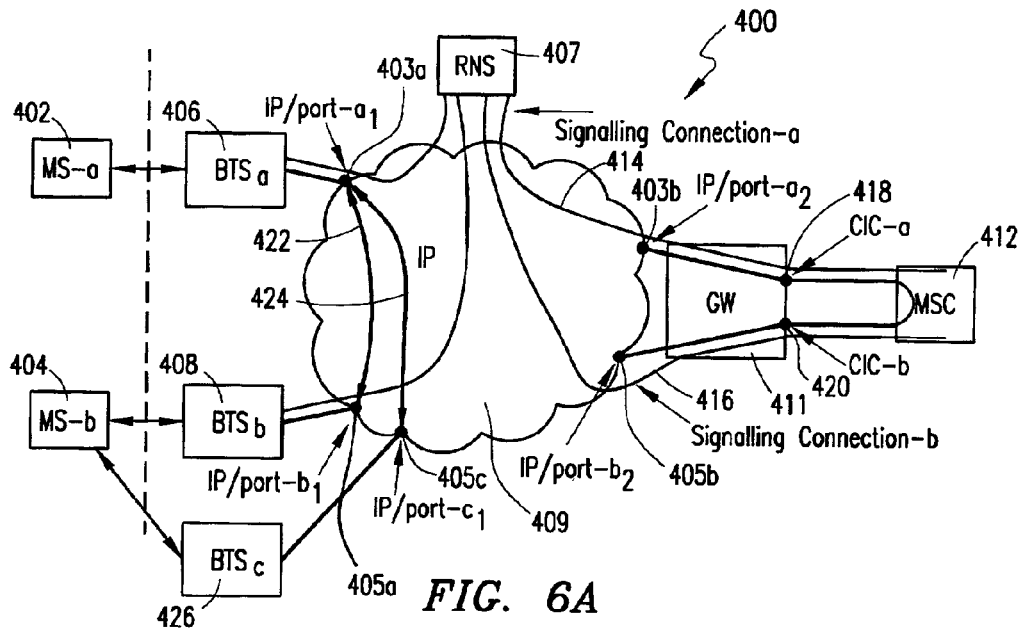
FIGS. 6A and 6B are related block diagrams of an IP-based BSS, which can be used to implement a handover procedure in accordance with the preferred embodiment of the present invention.
Figure 6B:
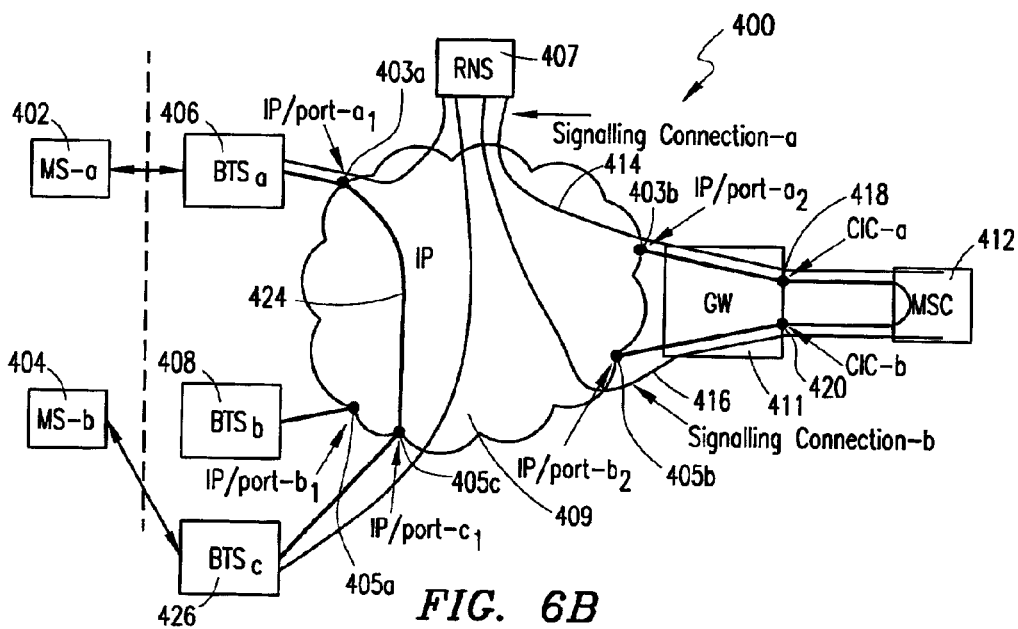

Specifically, FIGS. 6A and 6B are related block diagrams of an IP-based BSS 400, which can be used to implement the preferred embodiment of the present invention. In particular, the block diagrams shown in FIGS. 6A and 6B are useful to illustrate an example of a handover procedure that can be performed for one MS at a time. Referring to FIG. 6A, for this example, it can be assumed that RNS 407 has decided to perform a handover procedure for MS-b 404, and has identified BTS$_c$ 426 as a candidate recipient BTS. Also assume that an optimal routing connection 422 has already been established (e.g., using a "Join CIC" procedure) between BTS$_a$ 406 and BTS$_b$ 408. RNS 407 activates a radio channel in BTS$_c$ 426 and orders BTS$_c$ 426 to send and receive packets (speech frames) to and from IP/port-a$_1$ 403a. RNS 407 also orders BTS$_a$ 406 to start sending and receiving packets to and from IP/port-b$_1$ 405a and IP/port-c$_1$ 405c.

Next, RNS 407 orders MS-b 404 to perform the handover procedure. Once MS-b 404 has established a connection with BTS$_c$ 426 (via a radio air interface), the BSS 400 moves the Signalling Connection-b 416 to BTS$_c$ 426. Next, RNS 407 orders BTS$_a$ 406 to stop sending packets to BTS$_b$ 408. RNS 407 then releases BTS$_b$ 408 from the connection (and the call). As such, the RNS 407 controls both ends of the call and also controls the entire handover sequence. FIG. 6B shows the resulting connection 424 after the handover procedure has been completed. Notably, the resulting connection 424 is also configured for optimal routing (e.g., instigated by a "Join CIC" procedure) through the IP network 409, in accordance with the preferred embodiment of the present invention.

Figure 7A:
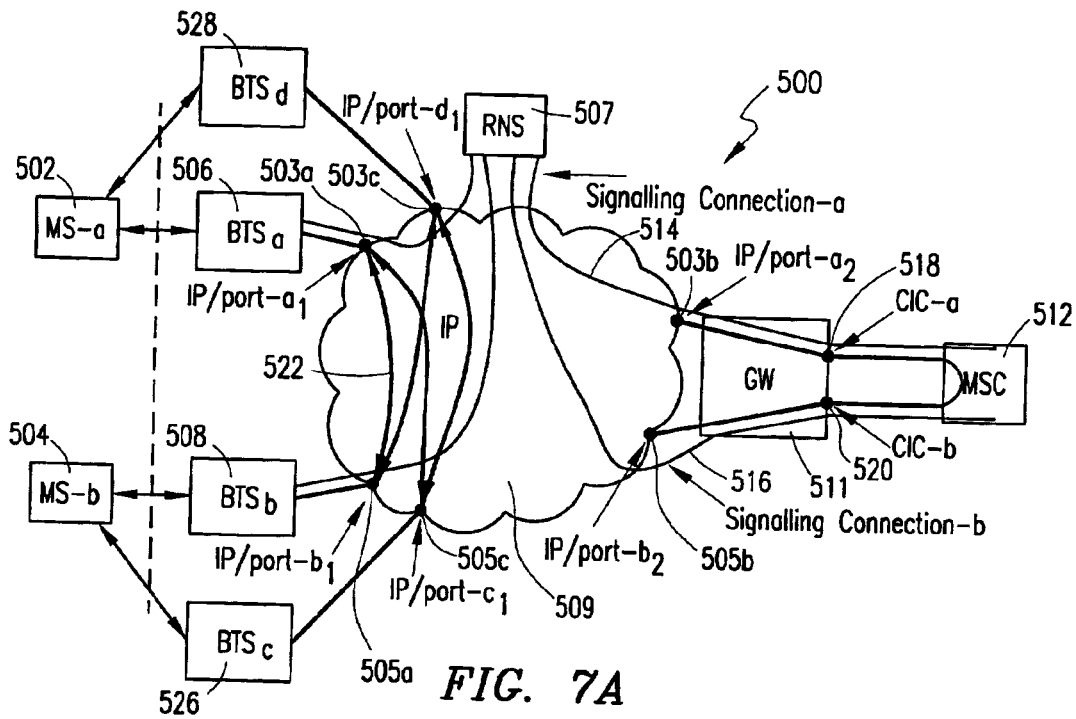
FIGS. 7A and 7B are related block diagrams of an IP-based BSS, which can be used to implement simultaneous handovers at two ends of a connection, in accordance with the preferred embodiment of the present invention.
Figure 7B:
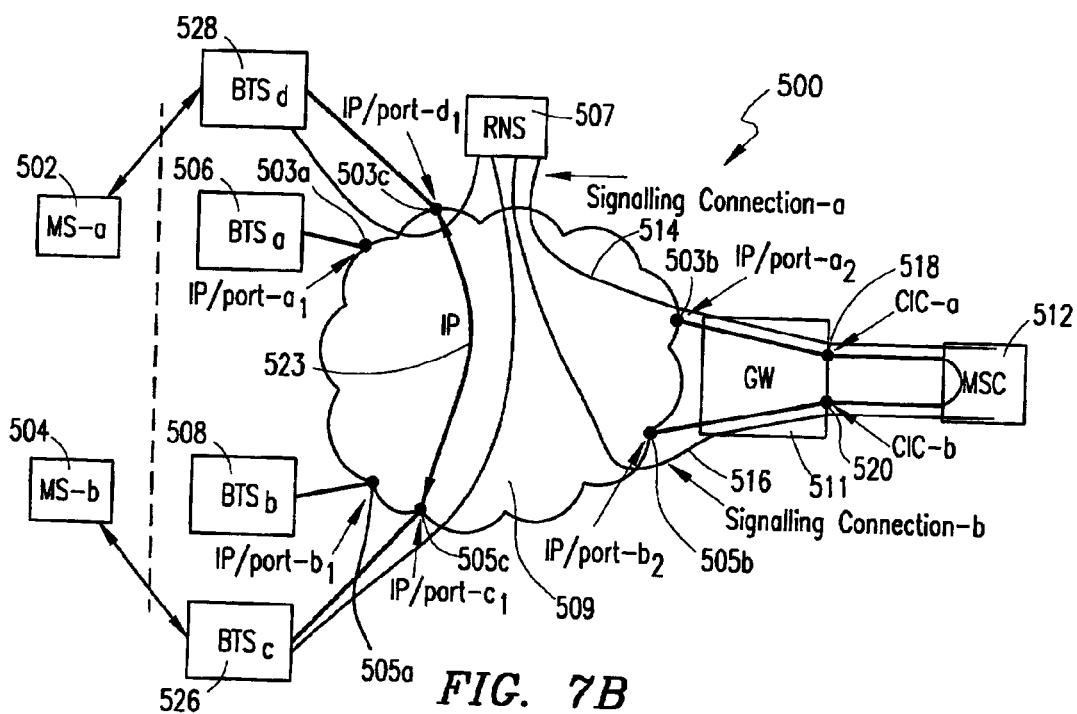

FIGS. 7A and 7B are related block diagrams of an IP-based BSS 500, which also can be used to implement the preferred embodiment of the present invention. In particular, the block diagrams shown in FIGS. 7A and 7B are useful to illustrate an example of a handover procedure that can be performed simultaneously for MSs at the ends of a connection. Referring to FIG. 7A, for this example, it can be assumed that RNS 507 is required to perform simultaneous handovers at both ends of a connection (e.g., for MS-a 502 and MS-b 504). It can also be assumed, for this example, that a connection exists between IP/port-a$_1$ 503a and IP/port-b$_1$ 505a prior to a handover procedure. In order to prepare for the two handovers, for this example, RNS 507 sets up (at handover) the following connective relationships via the IP network 509 (while also activating a radio channel in BTS$_c$ 526 and BTS$_d$ 528): IP/port-a$_1$ 503a to IP/port-b$_1$ 505a; IP/port-a$_1$ 503a to IP/port-c$_1$ 505c; IP/port-b$_1$ 505a to IP/port-d$_1$ 503c; and IP/port-c$_1$ 505c to IP/port-d$_1$ 503c. Once these preparations are completed, RNS 507 orders both MSs 502 and 504 to perform their respective handover procedures. In response, the MSs 502 and 504 establish their new connections via radio air interfaces to BTS$_d$ 528 and BTS$_c$ 526, respectively. The BSS 500 then moves Signalling Connections-a 514 and Signalling Connection-b 516 from BTS$_a$ 506 and BTS$_b$ 508 to BTS$_c$ 526 and BTS$_d$ 528. Next, RNS 507 releases BTS$_a$ 506 and BTS$_b$ 508 from the connection. In accordance with the preferred embodiment, the "old" optimally routed connection 522 is replaced by the "new" optimally routed connection 523 via the IP network 509 once the "simultaneous" handover procedures are completed. The "new" optimally routed connection 523 is shown for illustrative purposes in the block diagram of FIG. 7B.

In summary, in accordance with the preferred embodiment of the present invention, calls can be optimally routed via an IP network. As such, the existing problems related to tromboning can be successfully resolved. This solution is amplified in an IP-based BSS, because no switching of circuits is needed. Instead of setting up switches to re-direct a call, the BTSs can be informed about the new destination addresses. The IP network then routes the packets via the new destination addresses. In a circuit-switched environment, a BSC would need to know exactly which switches to operate in the network involved (i.e., the network topology has to be known). An RNS does not need to know the topology of an IP network.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for optimal routing of a call in a Base Station System, comprising the steps of:
sending a message to said Base Station System, said message including information associated with a plurality of ports in an IP network;
ordering a first base transceiver station to send at least a first packet associated with said call to a second base transceiver station via at least a first port of said plurality of ports in said IP network; and
ordering said second base transceiver station to send at least a second packet associated with said call to said first base transceiver station via at least a second port of said plurality of ports in said IP network, further comprising the step of: suspending a transfer of packets associated with said call from a gateway to said first base transceiver station and said second base transceiver station.

2. The method of claim 1, wherein said message comprises a Join CIC message.

3. The method of claim 1, wherein said message includes at least Circuit Identity Code information or Signalling Connection information.

4. The method of claim 1, wherein the steps are performed for a handover procedure for at least said first base transceiver station or said second base transceiver station.

5. A method for optimal routing of a call in a Base Station System, comprising the steps of:
sending a message to said Base Station System, said message including restoration information associated with a plurality of ports in an IP network; and
restoring a transfer of packets associated with said call from a gateway to a first base transceiver station and a second bass transceiver station via at least a first port and second port of said plurality of ports in said IP network, wherein said restoration information comprises Restore CIC information.

6. A system for optimal routing of a call in a Base Station System, comprising:
an IP network including a plurality of ports;
a gateway coupled to said IP network via at least one port of said plurality of ports;
a mobile switching center coupled to said gateway;
a radio network server;
a first base transceiver station coupled to said radio network server, and to said IP network at a first port of said plurailty of ports;
a second base transceiver station coupled to said radio network server, and to said IP network at a second port of said plurality of ports, said mobile switching center operable to;
send a message to said Base Station System, said message including information associated with at least one port of said plurality of ports in said IP network;
said radio network server operable to;
order said first base transceiver station to send at least a first packet associated with said call to said second base transceiver station via at least a first port of said plurality of ports in said IP network; and
order said second base transceiver station to send at least a second packet associated with said call to said first base transceiver station via at least a second port of said plurality at ports in said IP network, wherein said radio network server is further operable to: suspend a transfer of packets associated with said call from a gateway to said first base transceiver station and said second base transceiver station.

7. The system of claim 6, wherein at least one of said first base transceiver station or said second base transceiver station performs a handover procedure.

8. A system for optimal routing of a call in a Base Station System, comprising:
an IP network including a plurality of ports;
a gateway coupled to said IP network via at least one port of said pluraliy of ports;
a mobile switching center coupled to said gateway;
a radio network server;
a first base transceiver station coupled to said radio network server, and to said IP network at a first port of said plurality of ports;
a second base transceiver station coupled to said radio network server, and to said IP network at a second port of said plurality of ports, said mobile switching center operable to:
send a message to said Base Station System, said message including information associated with at least one port of said plurality of ports in said IP network;
said radio network server operable to:
order said first base transceiver station to send at least a first packet associated with said call to said second base transceiver station via at least a first port of said plurality of ports in said IP network; and
order said second base transceiver station to send at least a second packet associated with said call to said first base transceiver station via at least a second port of said plurality of ports in said IP network, wherein said message comprises a Join CIC message.

9. A system for optimal routing of a call in a Base Station System, comprising:
an IP network including a plurality of ports;
a gateway coupled to said IP network via at least one port of said plurality of ports;
a mobile switching center coupled to said gateway;
a radio network server;
a first base transceiver station coupled to said radio network server, and to said IP network at a first port of said plurality of ports;
a second base transceiver station coupled to said radio network server, and to said IP network at a second port of said plurality of ports, said mobile switching center operable to:
send a message to said Base Station System, said message including information associated with at least one port of said plurality of ports in said IP network;
said radio network server operable to:
order said first base transceiver station to send at least a first packet associated with said call to said second base transceiver station via at least a first port of said plurality of ports in said IP network; and
order said second base transceiver station to send at least a second packet associated with said call to said first base transceiver station via at least a second port of said plurality of ports in said IP network, wherein said message includes at least Circuit Identity Code information or Signalling Connection Information.

10. A system for optimal routing of a call in a Base Station System, comprising:
an IP network including a plurality of ports;
a gateway coupled to said IP network;
a mobile switching center coupled to said gateway; a radio network server;
a first base transceiver station coupled to said radio network server, and to said IP network at a first port of said plurality of ports;

a second base transceiver station coupled to said radio network server, and to said IP network at a second port of said plurality of ports, said mobile switching center operable to:

send a message to said Base Station System, said message including restoration information associated with at least one port of said plurality of ports in said IP network;

said radio network server operable to:

restore a transfer of packets associated with said call from said gateway to said first base transceiver station and said second base transceiver station, wherein said restoration information comprises Restore CIC information.

* * * * *